United States Patent [19]

Russell

[11] 3,795,902

[45] Mar. 5, 1974

[54] METHOD AND APPARATUS FOR SYNCHRONIZING PHOTOGRAPHIC RECORDS OF DIGITAL INFORMATION

[75] Inventor: James T. Russell, Richland, Wash.

[73] Assignee: Battelle Development Corporation, Richland, Wash.

[22] Filed: Nov. 26, 1971

[21] Appl. No.: 202,539

Related U.S. Application Data

[63] Continuation-in-part of Ser. No. 857,474, Sept. 12, 1969, Pat. No. 3,624,284.

[52] U.S. Cl. ..... 340/173 LM, 178/6.6 R, 178/6.7 R, 179/100.3 D

[51] Int. Cl. .......................................... G11c 13/04

[58] Field of Search ........... 178/6.6 R, 6.7 R, 6.7 A; 340/173 LM; 179/100.3 D; 250/219 D

[56] References Cited

UNITED STATES PATENTS 3,629,840 12/1971 Cullen......................... 340/173 LM

*Primary Examiner*—Terrell W. Fears

*Attorney, Agent, or Firm*—Klarquist, Sparkman, Cambell, Leigh, Hall & Whinston

[57] ABSTRACT

An electrical signal recording and playback system is described in which an analog input signal is converted to a digital signal that pulses a light source to form a single, series-recorded track of binary coded digital information including information spots arranged in groups, which track is played back in a similar manner. The photographic film is a compact, permanent record of long, useful lifetime which may be photographically copied to provide a plurality of inexpensive copies. Recorded information is synchronized for playback by detecting a configuration of the digital signal, either from known characteristics of the signal or from information added to the signal during recording. The information thus read out is suitably employed for shifting digital words in a reassembly shift register until proper word synchronization is achieved.

15 Claims, 26 Drawing Figures

METHOD AND APPARATUS FOR SYNCHRONIZING PHOTOGRAPHIC RECORDS OF DIGITAL INFORMATION

CROSS-REFERENCE TO RELATED APPLICATION

This is a continuation-in-part application of copending U.S. patent application, Ser. No. 857,474, now U.S. Pat. No. 3,624,284 filed Sept. 12, 1969 by James T. Russell, entitled "Digitally Coded Photographic Record and Playback System including Optical Scanner".

BACKGROUND OF THE INVENTION

The subject matter of the present invention relates generally to the storage and retrieval of digital information at extremely high densities, and in particular to a photographic record of digital information formed by an optically recording electrical input signal as a single track of digital information spots and playback apparatus for optically playing back the recorded digital information.

Briefly, one embodiment of a system in accordance with the present invention includes a recorder unit by which an analog input signal is converted into a digital electrical signal which pulses a single light that is optically scanned across a photosensitive plate to record the pulses of such digital signal in series as a single track of digitally coded information spots arranged in groups. A playback unit is then employed to optically scan the photo record of the recorded digital signal with a photocell to produce a digital electrical readout signal and to convert such digital readout signal into an analog output signal that is an accurate reproduction of the analog input signal.

The information is preferably synchronized for readout by detecting the configuration of the digital electrical signal, either from known characteristics of the signal, or from information added to the signal during recording. The information read out is suitably employed to provide synchronization of a local bit clock as well as a word synchronization signal. In general, the digital electrical signal which is read out is assembled in a shift register wherein the digital organization is detected. If this organization is incorrect, information is shifted in the register until proper word synchronization is achieved.

The apparatus of the present invention is especially useful for recording and playing back audio-visual analog signals, such as television video signals, high fidelity music audio signals, and other electrical analog signals. However, it is also possible to employ the present apparatus as part of any information storage and retrieval system including a digital computer system, such as typically used for data processing purposes, a character recognition system or a photograph inspection system in which the input signal is a light signal which is converted into a digital electrical signal that is optically recorded and played back by the apparatus of the present invention.

Previous attempts to optically record and/or play back an audio signal by means of a light beam have been commercially unsuccessful. Some of these prior apparatus have employed a light beam and photocell merely to play back a conventional phonograph record by reflecting light from the groove of such record, as shown in U.S. Pat. No. 3,138,669 of J. Rabinow et al. Recently attempts have also been made to record an audio signal by means of a light beam as a photographic track of varying light density, as well as optically playing back the photographic record so produced as shown in U.S. Pat. No. 3,251,952 of A. Shomer. However, in both instances an analog signal, rather than a digital signal, is recorded so that the amount of information which can be stored, as well as the quality of the signal reproduced during playback, is severely limited. It has been discovered that these disadvantages can be overcome if the analog signal is first converted into a digital signal before optically recording such signal as a track of light spots on a photosensitive medium in accordance with the present invention.

It has also previously been proposed to optically record and play back digitally encoded information on a photographic film to improve the transmission of speech signals over telephone lines by means of pulse code modulation, as shown in U.S. Pat. No. 2,595,701 of R. K. Potter. However, this system employs a plurality of light sources which are selectively energized by means of an electronic switching device in the form of a cathode ray tube so that the resulting photographic has a very low information density, which necessitates the use of a moving film strip as the photosensitive record. This disadvantage has been overcome in the apparatus of the present invention by employing a single pulsed light source focused to an extremely small focal spot, for example of about one three-hundredths millimeter in diameter, which is optically scanned across the photosensitive recording medium to produce a track of digitally recorded light spots having a very high density of up to approximately $5 \times 10^{+7}$ bits per square inch.

Correct readout of optically recorded information is dependent upon proper synchronization of the information for reorganization into the initially recorded "words" each representative of a particular number. Then, these words are sequentially employed, being representative of successive components of the audio or other analog signal. Synchronization can be achieved in various manners, e.g., by distinct physical separation of the recorded information into word groups. This method would tend to reduce the information density otherwise achievable in photographic recording. Unique marking is advantageously employed according to the present invention for synchronization purposes, but as the information density becomes greater, ready identification of the synchronizing signals can sometimes become difficult. This problem is solved in a method and apparatus according to various embodiments of the present invention wherein the synchronization is achieved through detection of the configuration of the digital signal or word itself, either from known characteristics thereof or from information added thereto.

The information storage and retrieval systems of the present invention have several advantages over systems previously employed. Thus, the present apparatus are less expensive than the video signal magnetic tape recording equipment. Also, they product a photographic type of record which can be easily reproduced inexpensively to provide high quality copies and which have a much longer useful lifetime than magnetic tape or phonograph records. In addition, the present digital coded photographic record is capable of storing a larger amount of information in a smaller space. Further-more, by employing a digital light signal to photographically record the information, the present apparatus provides a much higher signal-to-noise ratio in the analog output signal to enable a better quality reproduction of the analog input signal. Also, the analog output signal quality is more consistent because it is less dependent upon the recording medium, or the frequency response of the recording and playback devices. In addition, the present photographic records may be produced on flat plates which enables the use of an automatic record changing device similar to that used on a photo slide projector or phonograph.

It is therefore one object of the present invention to provide an improved information storage and retrieval system for optically recording and playing back digitally encoded electrical signals on a photosensitive medium at an extremely high information density.

Another object of the present invention is to provide a system for converting an analog input signal into a digitally encoded electrical signal and photographically recording such digital signal with a pulsed light source focused to a very small focal spot, and for optically scanning the resulting photograph with a light detector to produce a digitally encoded electrical readout signal which is subsequently converted into an analog output signal that has a high signal-to-noise ratio and is a high quality reproduction of the analog input signal.

A futher object of the present invention is to provide an improved digital signal recorder unit for optically recording a digitally encoded electrical signal on a photosensitive medium in the form of a single track of a series of light spots of extremely small size and high density per unit area.

Still another object of the present invention is to provide an improved optical scanner apparatus employing a rotating mirror which is radially deflected electromagnetically and by centrifugal force in order to provide a spiral shaped scan pattern and which is capable of scanning a flat photographic element while maintaining the optical path length substantially constant at all times during the scan.

An additional object of the present invention is to provide an improved digital signal playback unit for optically scanning a photograph of a track of digitally encoded spots with a light detector to produce an electrical digital readout signal corresponding thereto in an accurate and inexpensive manner.

A still further object of the present invention is to provide a photographic record element having a track of digitally encoded light spots recorded thereon at an extremely high density to provide a record which is inexpensive, compact, of long useful lifetime, and easily reproduced to provide copies of very high quality.

Another object of the present invention is to provide an improved information storage and retrieval system in which a photographic record stores digital information in a high density manner and from which synchronization for readout is advantageously obtained.

It is another object of the present invention to provide an improved information storage and retrieval system in which a photographic record stores digital information in a high density manner wherein the configuration of the digital signal is employed for synchronizing readout.

It is a further object of the present invention to provide an improved information storage and retrieval system in which a photographic record stores digital information in a high density manner and wherein the information is synchronized for readout by detecting a configuration of the digital signal from known characteristics thereof.

It is a further object of the present invention to provide an improved information storage and retrieval system in which a photographic record stores digital information in a high density manner wherein synchronization for readout is achieved by detecting a configuration of the digital signal according to information added to the digital signal during recording thereof.

In the drawings:

FIG. 10 is a block diagram of a synchronization system based on the detection of a negative zero or the like;

FIG. 11 is a block diagram of yet another synchronization system according to the present invention recognizing certain inherent characteristics of a data word for use in synchronizing the same;

FIG. 23 is an edge view of a photographic record having a number of photosensitive layers and recording synchronizing information at locations different from audio information and the like.

Figures 1, 5, 5A, 6, 6A:
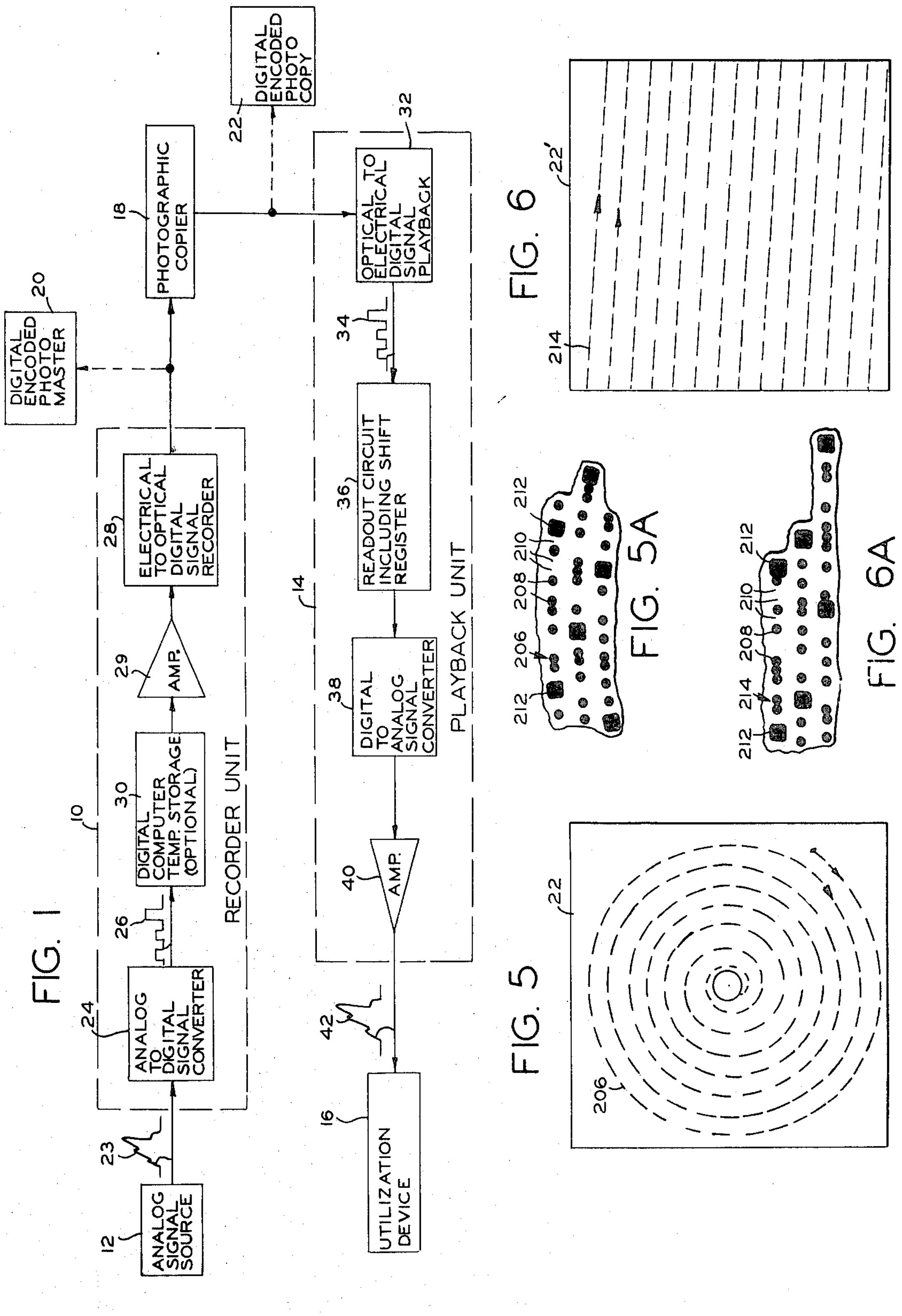
FIG. 1 is a block diagram of the analog-to-digital-to-optical recording and playback system forming one embodiment of the invention.
FIG. 5 is a plan view of one embodiment of a photographic record element having a spiral track of digitally encoded spots thereon, which is produced by the apparatus of FIG. 2.
FIG. 5A is an enlarged view of a portion of the record element of FIG. 5.
FIG. 6 is a plan view of another embodiment of a photographic record element having a rectangular raster track of digitally encoded light spots thereon which is recorded by the apparatus of FIGS. 3 and 4.
FIG. 6A is an enlarged view of a portion of the record element of FIg. 6.

As shown in FIG. 1, the information storage and retrieval system of the present invention includes a recorder unit 10 having its input connected to an audio-visual analog signal source 12, such as a microphone or television camera, and a playback unit 14 having its output connected to an analog signal utilization device 16, such as a loud speaker, television receiver, cathode ray oscilloscope, mechanical recorder, etc. In addition, a photographic copier 18 of any suitable type, such as that capable of making contact prints, may be provided so that a single digitally encoded photomaster 20 produced by the recorder unit 10 may be inexpensively copied and reproduced as a plurality of digitally encoded photocopies 22 which are employed as the information input to the playback unit 14. In this regard, the system of the present invention is similar to that of a commercial phonograph recording apparatus which produces a large number of phonograph records from a single master so that such copy records may be sold to the consumer at a relatively low cost.

The signal source 12 produces an audio-visual analog input signal 23 which may be an audio high fidelity music signal or a video television signal. This analog input signal is applied to the input of an analog to digital signal converter 24 provided in the recorder unit 10 and which produces a digitally encoded electrical output signal 26. However, it is also possible that the signal source 12 and the converter 24 may be of the type which convert a light analog input signal into a digital electrical output signal, such as is employed in character recognition systems and aerial photograph analyzers. The digital signal 26 is produced by conventional pulse code modulation in the form of a plurality of pulses separated into groups or words of pulses, each group corresponding to the instantaneous amplitude of a different portion of the analog input signal 23. The output of the analog to digital signal converter 24 may be directly connected to an electrical to optical digital signal recorder 28 through an amplifier 29 if it is desired to record the digital signal in real time simultaneously as it is generated. However, it may be desirable to temporarily store the digital signal 26 on the magnetic tape of a digital computer 30 and to record such signal later at a more convenient time. Thus, it can be seen that the digital computer 30, connected between signal converter 24 and amplifier 29, is an optical part of the recorder unit.

The electrical to optical digital signal recorder 28 converts the digital electrical signal into a digital light signal and photographically records such light signal by scanning a pulsed light beam of small focal spot size over a photosenstive element to produce a track of digitally encoded spots of less than about 0.01 millimeter in diameter. When a binary digital signal is employed, the spots may be light opaque or light transparent to provide the 0 and 1 bit of the binary code. It should be noted, however, that other digital encoded signals can be employed, such as a ternary digital system employing transparent, partially transparent and opaque dots on black and white film, and the like.

The playback unit 14 includes an optical to electrical digital signal playback apparatus 32 which scans a photocell across the digitally encoded photocopy 22 to produce a digitally encoded electrical signal 34 corresponding to the photograph of digitally encoded light spots. Thus the digital output signal 34 corresponds to the digital input signal 26 supplied to recorder 28. While the optical playback apparatus 32 is shown separate from the optical recorder apparatus 28, it may employ the same optical scanner and merely substitute a photocell in place of the pulsed light source used in such recorder. The optical playback apparatus 32 is connected through an electrical readout circuit 36 including a shift register to a digital to analog signal converter 38. The output of the signal converter 38 is connected to the utilization device 16 through an amplifier 40 so that an analog output signal 42, produced by such signal converter in response to digital signal 34, is applied to the utilization device. Thus, the analog output signal 42 is a high quality reproduction of the analog input signal 23, such output signal having a high signal-to-noise ratio and very little distortion. This high quality signal reproduction and the high information density on the photographic record are due to the fact that the grain size and the nonlinear optical density curves of photosensitive materials do not limit the recorded information density of digital signals as they do with analog signals.

Figure 2:
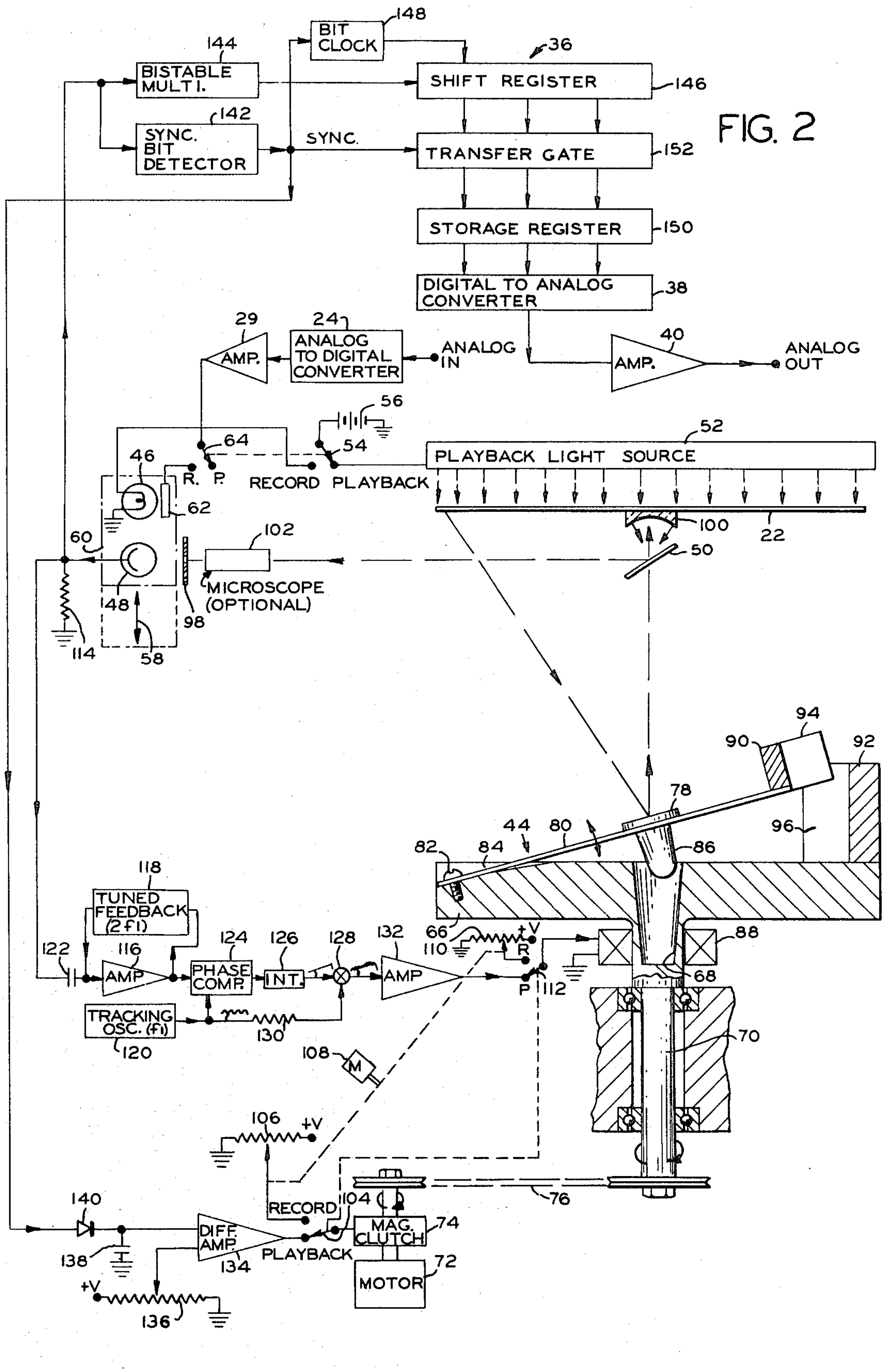
FIG. 2 is a partially schematic diagram of one embodiment of the system of FIG. 1, which employs an optical scanner having a magnetically deflected rotating mirror.

As shown in FIG. 2, one embodiment of the recording and playback system of FIG. 1 may employ the same optical scanner apparatus 44 for both the optical recorder 28 and the optical playback apparatus 32 merely by moving either a recording light source 46 or a photocell 48 into alignment with a beam splitting mirror 50 employed with such apparatus. The recording light source is a single light source of high intensity and small area, such as an arc lamp or a laser. In addition, a playback light source 52 of large area, which may be a bank of fluorescent lights, is positioned behind the digital encoded photocopy 22 and selectively energized by a switch 54 connected to a source of electrical power 56 which is represented by a battery but may actually be any D.C. voltage source, in the "playback" position of such switch. It should be noted that while the playback light source 52 is shown transmitting light through the digitally encoded photocopy 22, it may be reflected from such photocopy if the light source is positioned in front of the photocopy out of the path of the scanning light beam, such as by employing a circular fluorescent lamp surrounding the photocopy. In the "record" position of switch 54, the recording light source 46 is energized to enable recording of the digital information, when the light source is moved in the direction of arrows 58 into the position occupied by the photocell 48, by the downward movement of a carriage 60 supporting both such light source and photocell.

While the digital encoded input signal produced by signal converter 24 of the record unit 10 may instead be applied directly to the light source 46, such signal is shown being applied to an electronic shutter 62 in front of such light source to produce a beam of light pulses. Shutter 62 may be a Kerr cell which contains nitrobenzene liquid, or may be a series of crystals of potassium dihydrogen phosphate, both such Kerr cell and such crystals having the property of electric double refraction. Thus, shutter 62 is connected to the output of amplifier 29 by a two position selector switch 64 whose movable contact is ganged to that of switch 54 so that such switch is open in the "playback" position shown and closed in the "record" position. If such a shutter is employed, light source 46 may be a continuously operating laser to provide an intense source of collimated monochromatic light.

The optical scanner apparatus 44 includes an annular support plate 66 of aluminum or other nonmagnetic material having an axially extending cavity 68 and which is mounted for rotation on shaft 70. The shaft 70 is rotated about a vertical axis by a constant speed electric motor 72 which is connected through a magnetic clutch 74 and a belt drive 76 to such shaft. A flat mirror element 78 is attached to the upper side of a leaf spring 80 intermediate the ends of such spring and one end of the spring is fixed to the periphery of the support plate 66 by a screw 82 or other suitable means. Spring 80 extends through a guide slot 84 provided in the upper surface of plate 66 and intersects the axis of rotation of shaft 70 so that the center of the scanning mirror 78 is positioned generally on such axis of rotation. A solenoid element 86 of magnetic material is attached to the bottom side of the spring 80 beneath mirror 78 in position to be inserted into the cavity 68 in support plate 66 when such spring is deflected downward. Both cavity 68 and solenoid element 86 are of a frustoconical shape. An electromagnetic coil 88 is positioned about the shaft of the rotating support plate 66 adjacent the bottom of cavity 68 so that when an electrical signal is applied to such coil the solenoid element 86 is attracted into such cavity or repelled out of the cavity due to the magnetic field produced by such coil. This causes deflection of the spring 80 and radial scanning movement of the mirror 78 over the digitally encoded photocopy 22.

In addition, a weight 90 is attached to the free end of the spring 80 in order to cause such spring to deflect downwardly due to the centrifugal force on such weight when the speed of rotation of support plate 66 is increased. In order to dampen the oscillations of spring 80, a slotted permanent magnet 92 is attached to the upper surface of the rotating support plate 66 and a thin vane 94 of electrically conductive material provided on the end of weight 90 is positioned within the slot 96 of such magnet so that such vane moves up and down between the north and south poles of the magnet, which produce eddy currents in vane 94 to cause a damping action. In place of such permanent magnet damping, it is also possible to employ oil damping by filling cavity 68 with oil so that solenoid element 86 operates in the manner of a dash pot.

As stated previously, a beam splitter mirror 50 which transmits about 50 per cent and reflects about 50 per cent of the light directed onto such splitter, is positioned at an angle of 45° with respect to the axis of rotation of shaft 70 and with respect to the axis of the light path between such mirror and an apertured light mask 98 positioned in front of the photocell 48 or the light source 46, 62. A spherical mirror 100 is positioned between the beam splitter 50 and the center of the photosensitive element 22. In addition, a light microscope 102 may be provided between the mask 98 and the beam splitter 50 in order to focus the light souce into a small diameter spot on the record element 22 or to limit the viewing field of the detector to such a small spot. However, the microscope is optional and may not be necessary. Also it is possible to employ an objective lens between the microscope 102 and the beam splitter 50 in which case the spherical mirror 100 can be eliminated and the beam splitter rotated ninety degrees.

During the recording operation of the apparatus of FIG. 2, the carriage 60 is moved downward into the lower position so that light source 46 is in alignment with the aperture in mask 98, and switch 54 is moved to the "record" position to energize such light source and to turn off playback light source 52. In addition, switch 64 is moved to the record position R to connect the electronic shutter 62 to the analog to digital converter 24, so that digitally encoded pulses are applied to such shutter through amplifier 29 to provide a plurality of light pulses. These digitally coded light pulses are transmitted to beam splitting mirror 50, which reflects approximately 50 percent of the light to the spherical mirror 100, which focuses and again reflects this light to transmit 25 percent of the light through beam splitter 50 onto the scanning mirror 78. The light pulses are then reflected by the scanning mirror 78 onto the photosensitive element which in this case would be the photomaster 20 in place of the photocopy 22 shown. The scanning mirror 78 is rotated about the axis of shaft 70 when a switch 104 is moved to the "record" position to connect the magnetic clutch 74 to the movable contact of a potentiometer 106 whose end terminals are connected between a positive D.C. voltage source and ground. The movable contact potentiometer 106 is adjusted automatically, such as by means of an electric motor 108, to gradually increase the speed of rotation as the light beam is deflected radially inward on the photosensitive element. This radial deflection is accomplished when a switch 112 is in the record position R connecting the coil 88 to the movable contact of another potentiometer 110 whose end terminals are connected to a source of positive D.C. voltage and ground. The movable contact of potentiometer 110 may also be coupled to motor 108 to gradually increase the current flowing through coil 88 causing the scanning mirror 78 to be deflected radially inward due to the increased magnetic field. In addition, the centrifugal force on weight 90 caused by the increase in speed of rotation also tends to cause a radially inward deflection of the scanning mirror. As a result, the optical scanner 44 provides a radial scan on the photosensitive element and the light pulses are recorded as a single spiral track of digitally coded light spots which are positioned in series, each successive spot being a greater distance along such track, as shown in FIGS. 5 and 5A. It should be noted that potentiometers 106 and 110 must provide a smooth changing control voltage to the magnetic clutch and the deflection coil so that wire wound potentiometers are not suitable, but a continuous resistance layer potentiometer may be employed. Also the resistance of such potentiometers may vary in a non-linear fashion.

During the playback operation of the apparatus of FIG. 2, switch 54 is moved to the "playback" position to turn on the playback light source 52 and turn off recording light source 46. Also switch 64 is moved to the playback position P to disconnect shutter 62 from amplifier 29, and carriage 60 is moved upward into the position shown to locate the photocell 48 in alignment with the aperture in mask 98. Switches 104 and 112 are also moved to the playback positions shown. The light image of the spots on photocopy 22 are reflected from scanning mirror 78 through beam splitter 50 onto the spherical mirror 100, which reflects and also focuses such image back onto the beam splitter 50, such beam splitter again reflecting the light image through microscope 102 onto photocell 48. The photocell converts the light pulses into digitally encoded electrical pulses of current which are transmitted to ground through a load resistor 114 connected to the anode of the photocell. The digital voltage pulses thus produced across resistor 114 are transmitted to the readout circuit 36 and to a deflection control circuit.

The deflection control circuit includes an operational amplifier 116, such amplifier having a negative voltage feedback network 118 which is tuned to twice the frequency ($f_1$) of a tracking oscillator 120 whose function is hereafter described. The input of operational amplifier 116 is connected through a coupling capacitor 122 to photocell 48, and the output of such amplifier is connected to one input of a phase comparator 124 whose other input is connected to the output of tracking oscillator 120. The analog output signal of the phase comparator 124 is transmitted through an integrator circuit 126 to one input of a summing network 128, whose other input is connected through a coupling resistor 130 to the output of the tracking oscillator 120. The output signal of the summing network 128 is transmitted through an amplifier 132 and switch 112 to coil as during playback. Since the average amplitude of digital pulses integrated by the tuned feedback network transmitted to integrator 126 varies as the scanning mirror 78 moves across the track, the output voltage of the integrator 126 also varies which changes the control voltage applied to coil 88 causing gradual radially inward deflection of the scanning mirror 78 so that the mirror 78 follows the track.

The speed of rotation of the scanning mirror 78 is controlled by the output signal of a differential amplifier 134 which is applied to magnetic clutch 74 in the "playback" position of switch 104. One input of the differential amplifier is connected to the movable contact of potentiometer 136 whose end terminals are connected between a source of positive D.C. voltage and ground. The other input of the differential amplifier is connected across an integrating capacitor 138 whose plates are connected between the cathode of a coupling diode 140 and ground. The anode of diode 140 is connected to the output of a sync bit detector 142 forming part of the readout circuit 36. The sync bit detector 142 has its input connected to the output of photocell 148 and produces a sync output pulse when such a sync pulse occurs in the output signal of such photocell, such sync pulse being of larger amplitude than the digitally encoded pulses. These sync pulses are integrated by capacitor 138 and the resulting varying voltage is applied as the control voltage to the input of differential amplifier 134, so that the speed of rotation of shaft 70 gradually increases as the scanning mirror 78 is radially deflected inwardly in order to maintain the sync bit rate constant.

The sync pulses are produced by sync light spots recorded on the photocopy 22 between the groups of digitally encoded spots to separate such groups or words. These sync light spots may be approximately twice the diameter of the digitally encoded spots and are recorded by applying a larger voltage pulse to the electronic shutter 62 to cause more light to be transmitted through such shutter.

In order to maintain the scanning mirror locked onto the spiral track of light spots on the record element 22, the tracking oscillator 120 adds a small amplitude sine wave tracking signal to the deflection control signal applied to coil 88. The tracking signal causes the scanning mirror to oscillate back and forth across the track at a low frequency, $f_1$ for example, about 1 cycle per 100 words or 30 to 70 oscillations per revolution as such scanning mirror moves along the track. This produces a correction signal which is combined with the deflection control signal in the output signal of photocell 48, such correction signal being filtered by capacitor 122 and amplifier 116, 118 to smooth out the bit current pulses and provide the correction signal with a frequency $2f_1$ which is equal to twice the frequency of the tracking oscillator 120 due to the fact that the scanning mirror crosses the track twice for each cycle of the sine wave output signal of the tracking oscillator. This correction signal is compared with the output signal of the tracking oscillator in phase comparator 124 and if these two signals are not in phase, which indicates that the mirror has started to go off the track, the output voltage of the integrator 126 is automatically changed to position the scanning mirror back on the track.

The readout circuit 36 includes a bistable multivibrator 144 whose input is connected to the output of the photocell 48 in common with the input of the sync bit detector 142. Such bistable multivibrator may be of the Schmitt trigger type which is triggered on the leading edge of each digital pulse and reverted by the trailing edge of such pulse to produce a rectangular output pulse which is transmitted to a shift register 146. A free running bit clock pulse generator 148 is provided with its input connected to the output of the sync detector 142 to synchronize such bit clock with the sync pulses. The output of the bit clock is connected to the shift register 146 to transmit shift pulses to the shift register of the same frequency as the digital encoded signal produced by photocell 48. Once a word or group of digital pulses has been received by the shift register 148, they are transmitted to a storage register 150 through a transfer gate 152 which is normally nonconducting and is rendered conducting by a sync pulse applied to the transfer gate from the sync bit detector 142. The output of the storage register 150 is connected to the input of the digital to analog converter 38 which converts the digital signal into the analog output signal, such analog output signal being transmitted through amplifier 40 to the output terminal of the system. As stated previously, the analog output signal is an accurate reproduction of the analog input signal applied to converter 24.

Figures 3, 4:
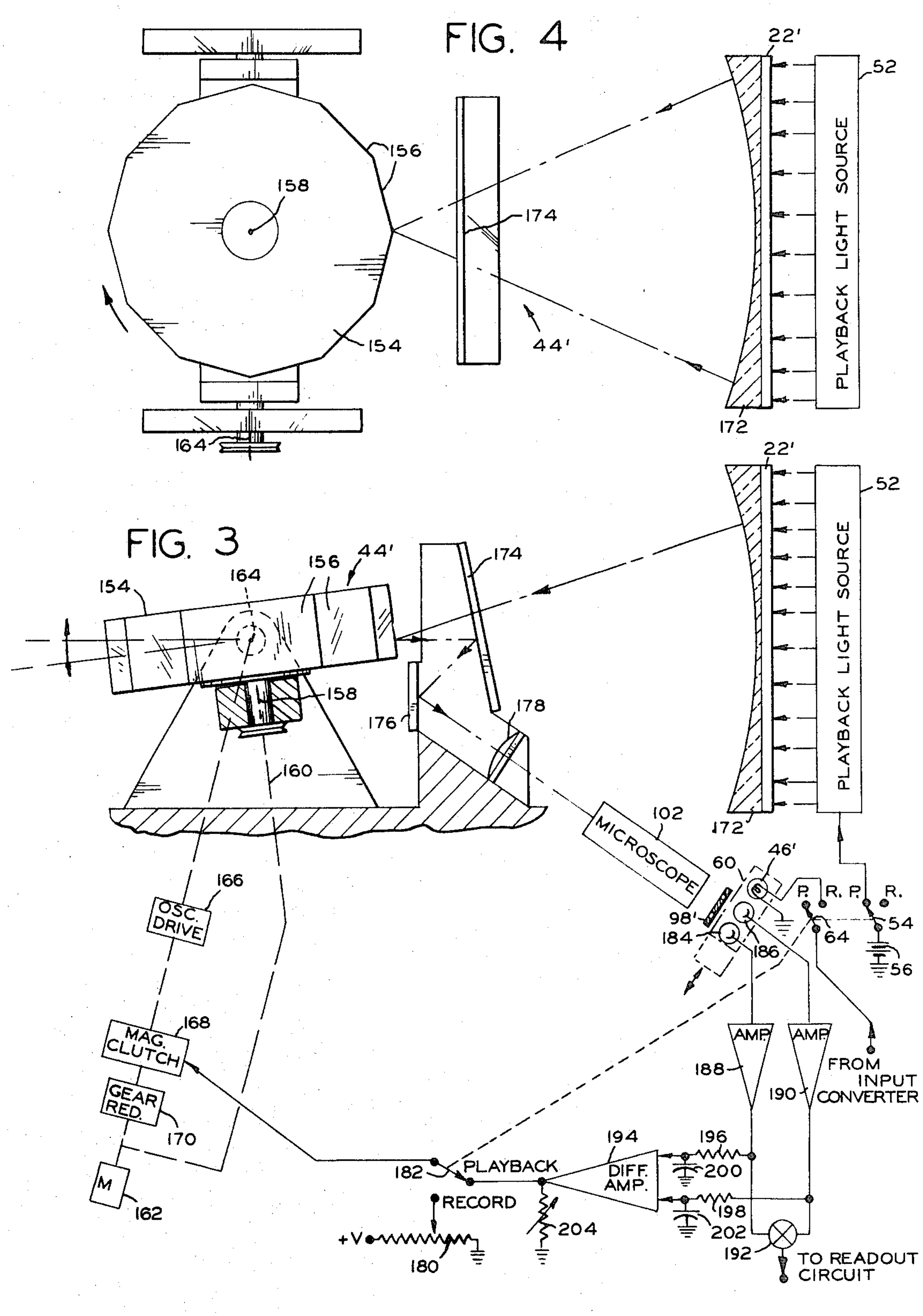
FIG. 3 is a partially schematic view of another embodiment of the system of FIG. 1, which employs an optical scanner having a mechanically oscillated rotating polygon mirror.
FIG. 4 is a plan view looking at the top of the optical scanner apparatus of FIG. 3.

Another embodiment of the recording and playback system of the present invention is shown in FIGS. 3 and 4. The optical scanner 44' employed in this embodiment includes a polygon mirror 154 which may be provided with twelve flat mirror surfaces 156 radially spaced uniformly about the axis of rotation 158 of such polygon mirror. The polygon mirror 154 is rotated continuously in a generally horizontal direction about the vertical axis 158 by a direct drive 160 copling such mirror to an electric motor 162. In addition, the polygon mirror is oscillated in a generally vertical direction about a horizontal axis 164 by means of an oscillating drive 166 connecting such mirror to motor 162 through a magnetic clutch 168 and a gear reducer 170. A flat image field corrector plate 172 in the form of a negative lens is positioned in front of the photocopy 22 to compensate for the changes in scanning distance between the mirror segments 156 and such photocopy during scanning. Thus, the correction plate is provided with a greater thickness adjacent its outer edges to compensate for the greater scanning distance between the mirror segments and the outer edge of the photocopy 22. A beam splitter 174 is positioned between the field corrector 172 and the polygon mirror 154. Another mirror 176 is positioned in the light path between the beam splitter 174 and the microscope 102. An objective lens 178 is employed between mirror 176 and the microscope, in place of the spherical mirror 100 of the embodiment of FIG. 2, for focusing.

The apparatus of FIGS. 3 and 4 operates in a similar manner to that of FIG. 2 during recording, except that the polygon mirror provides a rectangular scan to produce the sequential straight line raster track shown in FIGS. 6 and 6A. Thus magnetic clutch 168 is connected to the movable contact of potentiometer 180, whose end terminals are connected between a positive D.C. voltage source and ground in the "record" position of switch 182. It should be noted that a fixed setting of the movable contact potentiometer 180 determines the vertical scanning speed during recording. In addition, switches 54 and 64 are moved to the record position R to disconnect the playback light source 52 from power supply 56 and to connect the recording light source 46' to the output of the analog to digital converter 24 through amplifier 29. The pulsed light source 46' should be a gas discharge strobe light similar to that employed in photography, or some other light source capable of a high frequency response to enable pulsing.

During playback, the apparatus of FIGS. 3 and 4 operates in a similar manner to that of FIG. 2 except that a pair of photocells 184 and 186 are positioned in alignment with corresponding apertures in mask 98' so that the viewing fields of such photocells are located on the opposite sides of the track of light spots recorded on photocopy 22. The anodes of photocells 184 and 186 are connected through amplifiers 188 and 190, respectively, to the inputs of a summing network 192, whose output is connected to the inputs of the bistable multivibrator and the sync bit detector of the readout circuit 36 of FIG. 2. In addition, the outputs of amplifiers 188 and 190 are respectively connected to the inputs of a differential amplifier 194 through coupling resistOrs 196 and 198 and integrating capacitors 200 and 202, respectively. The output of the differential amplifier 194 is connected to the magnetic clutch 168 in the "playback" position of switch 182 to provide a control voltage signal for such magnetic clutch which adjusts the vertical velocity of the polygon mirror to maintain the viewing fields of the detectors 184 and 186 on the opposite sides of the track in order to follow such track. Thus, as a scanning mirror, segment 156 gets off the track during playback, the output signals of the detectors 184 and 186 will be unequal and will produce a difference signal at the output of differential amplifier 194 which compensates for the error to vertically position the mirror segment back on the track. It should be noted that the D.C. output voltage of the differential amplifier 194 is equal to that of the voltage on the movable contact of potentiometer 180 when the input signals to such differential amplifier are equal, so that the vertical oscillation drive 166 moves the polygon mirror vertically at the same speed as during recording. Adjustment of the D.C. output voltage of the differential amplifier 194 may be achieved by a variable load resistor 204 connected to the output of such amplifier.

As shown in FIG. 5, the photocopy 22 of the record element produced by the apparatus of FIG. 2, has a spiral track 206 of digitally encoded information spots including opaque spots 208 recorded by light pulses which may correspond to "one" bits of a binary digital code, and transparent spots 210 which correspond to the "zero" bits of such binary code. The spots 208 and 210 each have a diameter less than approximately 0.01 millimeter and typically on the order of one three-hundredths millimeter. In addition, synchronizing spots 212 are provided on the track between successive word groups of digitally encoded information spots and are distinguishable from the information spots such as by being of different size. Thus, in the embodiment of FIG. 5A, one word group equals 15 binary bits which in the topmost line of the track consists of eight transparent spots and seven opaque spots. The sync spots 212 are approximately twice the diameter of the opaque digital spots 208 and the spacing between the centers of adjacent lines of spots is also equal to approximately twice the diameter of the opaque digital spots 208, so that adjacent sync spots will almost touch.

The rectangular raster track 214 of digitally encoded spots on the photocopy 22' produced by the apparatus of FIGS. 3 and 4 forms a sequential straight line path back and forth across the record element which is scanned as a single track. It should be noted that adjacent lines of such track are sloped downward due to the continuous vertical movement of the polygon scanning mirror 154. Also it should be noted that the top of the next successive line corresponds with the bottom of the preceding line because adjacent lines are scanned by successive mirror segments 156 of the polygon mirror. The size and spacing of the opaque and transparent digitally encoded spots 208 and 210 of FIG. 6A is similar to that of FIG. 5A.

The photosensitive record elements 22 and 22' may be transparent plates of glass or methyl methacrylate plastic having a layer of photosensitive material coated on one side thereof, if the playback light source is to be transmitted through such record elements in the manner of FIGS. 2, 3 and 4. However, if light reflecting photographs are employed, record elements 22 and 22' may be of any suitable dimensionally stable support material such as plastic which is provided with the photograph of the digitally encoded light tracks on its outer surface. A protective coating of plastic may be necessary over such photographs and over any photosensitive coating on a transparent plate to prevent scratching of the records during handling. In addition, it is possible that a photosensitive glass can be employed to form the record element without the need for a separate layer of photographic material, such glass being etched after it is exposed to the light pattern of the digitally encoded tracks. The etched spots may be filled with light opaque material. In this connection, it should be noted that photochromic materials may also be used.

Additionally, the playback record can be manufactured by mechanical means such as printing or embossing, or by thermal means such as by thermoplastic or material evaporation techniques. Alternatively, the playback record can be manufactured by chemical etching such as by using photoresist techniques, for example, as set forth with reference to the glass above, but also applicable to other materials of the photoresist type.

In accordance with one aspect of the present invention, synchronization of the digital recording readout is desirably achieved primarily on the basis of data configuration or informational content of the data. This synchronization pertains, for example, not only to synchronization of bit clock 148 in FIG. 2 but also to word synchronization as applied to transfer gate 152 in FIG. 2.

Figure 16:
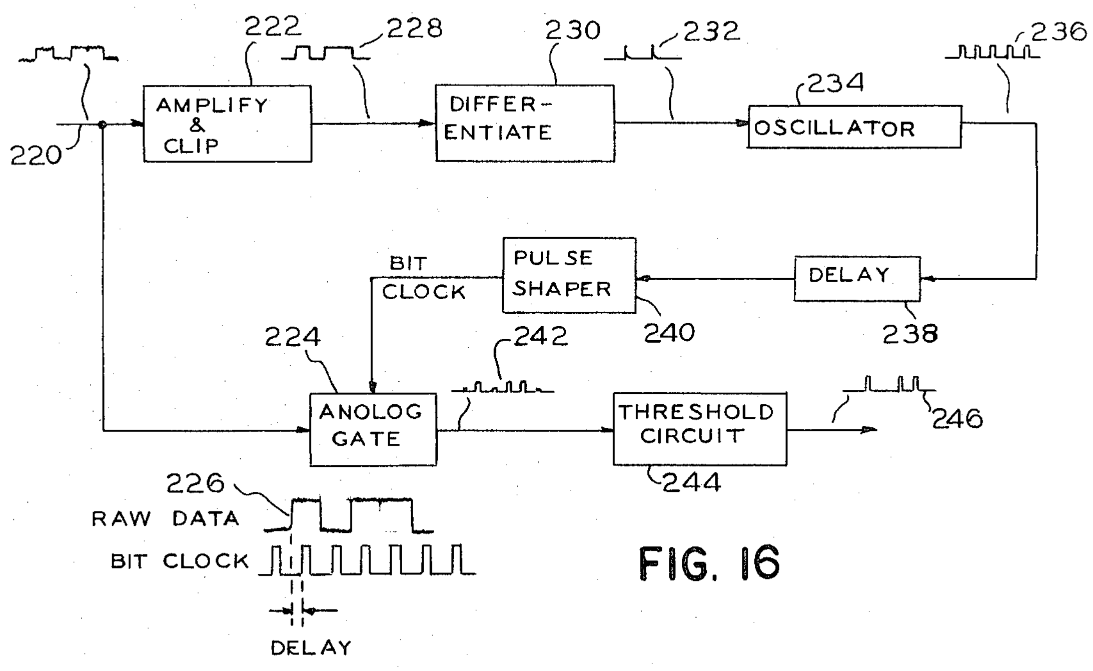
FIG. 16 is a block diagram of a bit clock circuit according to the present invention.

A bit clock circuit for the system according to the present invention is more fully illustrated in FIG. 16. Raw data is received, e.g., from photocell 48 in FIG. 2, on lead 220 coupled as an input to amplifying and clipping circuit 222 and analog gate 224. The raw data input is indicated by way of example at 226 with the same being squared in the amplifying and clipping circuit to provide waveform 228. A differentiating circuit 230 supplies a bit clock sync pulse output 232 employed for synchronizing oscillator 234. Oscillator 234 may be of the free-running multivibrator type, but is synchronizable by the pulse waveform 232. The nominal operating frequency of oscillator 234 is selected to be substantially the same as the repetition rate of the data and provides an output train of pulses indicated at 236. This train of pulses is applied via delay circuit 238 and pulse shaper 240 to provide a "bit clock" output for operating analog gate 224. The "bit clock" output, as thus delayed, starts shortly after the wave front of the raw data pulse which caused synchronization of the "bit clock" pulse output. The output of analog gate 224 comprises a reshaped input signal as indicated at 242, gated by the "bit clock" output to have the reshaped waveform derived from the oscillator. A threshold circuit 244 removes any partial outputs from analog gate 224 and supplies a properly reshaped pulse input 246 for application to shift register 146 in FIG. 2.

Figure 7:
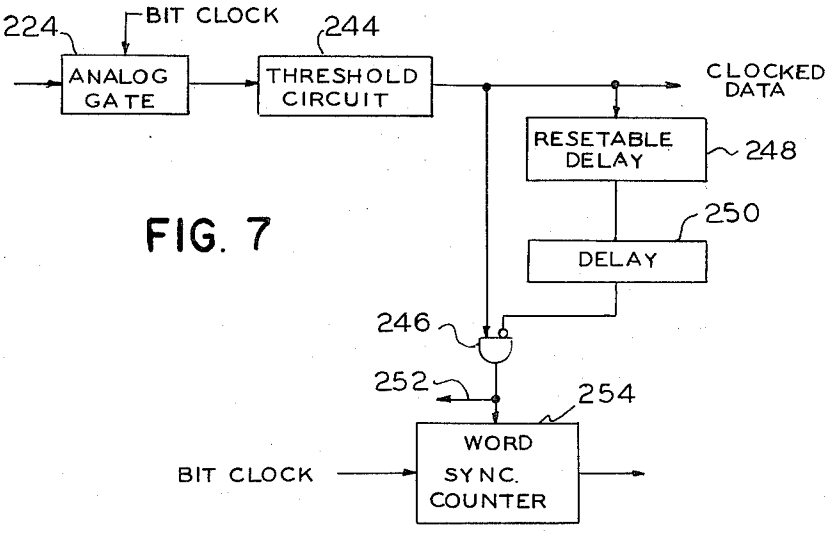
FIG. 7 is a block diagram of a synchronization system according to the present invention wherein a raster line break is recognized for synchronization purposes.
Figure 17:
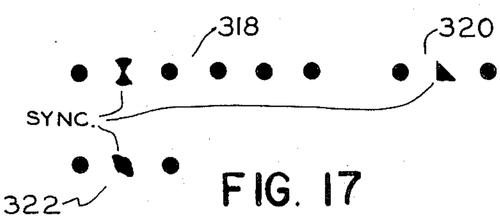
FIG. 17 is a plan view of portions of photographic records according to the present invention, each having a particular shaped spot recorded thereupon.

Turning to FIG. 7, illustrating a first word synchronizing circuit according to the present invention, the bit clocked analog gate 224 and threshold circuit 244 correspond to similarly numbered elements in FIG. 17. The FIG. 7 circuit is, however, applicable to the embodiment of FIGS. 3 and 4 wherein a storage configuration in the form of a raster is provided on the photo record. The first bit of each raster line in the method and apparatus according to FIG. 7 has a predetermined value, i.e., a binary one value indicated by the presence of a recorded spot.

In FIG. 7 it will be seen that and-gate 246 is normally inhibited by resettable delay circuit 248, the output of which is coupled to the inhibiting input of the and-gate via one bit delay circuit 250. Reception of any data from threshold circuit 244 provides an output from resettable delay circuit 248 for a predetermined time. After the cessation of a line of data, resettable delay circuit 248 resets within a predetermined time. However, delay circuit 250 continues to cause inhibition of and-gate 246 for approximately an additional data bit time. The delays are arranged to be well within the retrace time of the raster, with resettable delay circuit 248 again being activated by the first data bit of the next raster line. However, delay circuit 250 delays application of the inhibiting input to and-gate 246 for approximately one bit time, allowing and-gate 246 to detect the first bit of the next raster line, which first bit is suitably arranged to be a binary one. Therefore and-gate 246 provides an output on lead 252 which may be used for resynchronizing oscillator 234 in FIG. 16, as well as for resynchronizing word sync counter 254. Word sync counter 254 is a counting or dividing circuit receiving the bit clock and employed to operate transfer gate 152 in the FIG. 2 circuit. Thus, the word sync counter 254 is arranged to provide an output count at the end of each word, performing the function of the sync bit detector 142 in FIG. 2.

Figure 8:
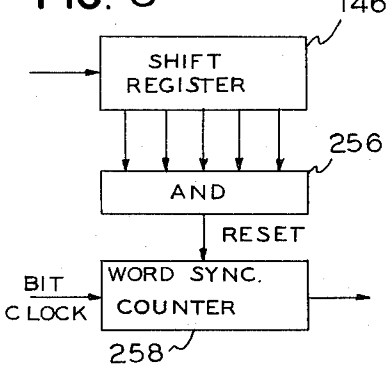
FIG. 8 is a block diagram of another synchronization system according to the present invention wherein a particular code word is recognized for producing word synchronization.

Another embodiment according to the method and apparatus of the present invention is illustrated in FIG. 8. In this circuit, the outputs of bit positions from shift register 146 (from FIG. 2) are applied to an and-gate 256, in addition to transfer gate 152 in FIG. 2. A special word is periodically added to the data stream during recording. The pattern of bits in that word is different from any other word, i.e., the normal data word does not contain or is not allowed to contain words of that pattern. As an example, all ones (negative full scale) can be chosen as the code, meaning that the largest allowed negative data value would be one bit less than full scale. As the bit stream passes through word length shift register 146, the and-gate 256 recognizes the code and periodically resets word sync counter 258 to zero in proper synchronization with the entry of the entire code word into register 146.

Figure 9:
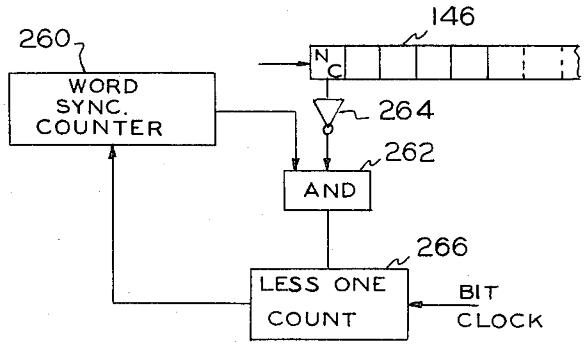
FIG. 9 is a block diagram of yet another synchronization system wherein a particular word bit is recognized for achieving word synchronization.

A further circuit according to the method and apparatus of the present invention is illustrated in FIG. 9. This circuit and synchronization method is based upon a "no change bit", i.e., a bit in each word which is always the same. This bit should be at a specified location in the shift register 146 when word sync counter 260 generates a pulse. The particular location is interrogated at that time by means of and-gate 262 and if it is of the proper value no action is taken. However, if the bit is absent, the combination of the output of the word sync counter, and the output of inverter 264 derived from the no change bit position, actuates and-gate 262 for operating "less one count" circuit 266. Less one count circuit 266 (which may be of the type hereinafter more fully described) subtracts one bit clock from the stream of bit clocks normally applied to the word sync counter 260, and consequently the sync from word sync counter 260 will be shifted by one clock position. All other bits in a word change from word to word, with only the special bit being fixed, and therefore over a short time the internal sync from word sync counter 260 will shift to match the data stream sync bit.

Figures 10, 11:
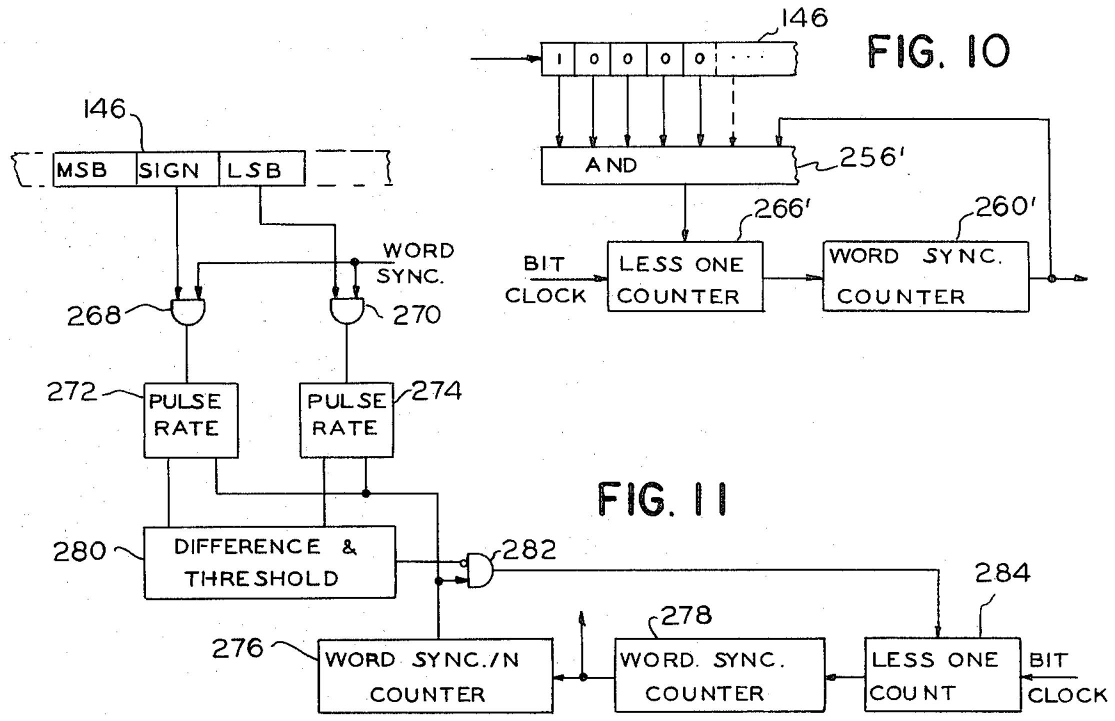

A further method and circuitry for implementing the same according to the present invention is illustrated in FIG. 10. When an analog signal is converted to digital form, there can be an ambiguous situation about the sign or polarity of the digital number as zero is approached from either direction. That is, there can be either a positive zero or a negative zero. In most analog-to-digital converters, one is suppressed (usually the negative zero) to prevent confusion. According to the present method, this negative zero can be suppressed as usual. However, if that particular bit pattern should occur in register 146, it would mean that the synchronization is incorrect and hence words are being incorrectly assembled. The circuit of FIG. 10 is similar to that illustrated in the circuits of FIGS. 8 and 9 with an and-gate 256' being employed for detecting the "negative zero". Upon such detection, less one count circuit 266' subtracts one bit from the data stream operating word sync counter 260'. The synchronization is thus changed or delayed one bit at a time until correct. It is noted the word sync output of the word sync counter is also employed as enabling input for and-gate 256'.

Referring to FIG. 11, disclosing another method and apparatus embodiment of the present invention, shift register 146 provides outputs in adjacent bit positions to and-gates 268 and 270, respectively, also each receiving an enabling word sync input. The outputs of gates 268 and 270 are applied to respective pulse rate circuits 272 and 274. These rate circuits suitably comprise accumulating counters for counting changes in bit positions and are followed by digital-to-analog converters which convert the accumulated count of each pulse rate circuit to an analog value. The accumulating counters are reset by word sync/N counter 276 which divides the output of word sync counter 278 by a suitable integer N for slowing response. The difference between the analog outputs of pulse rate circuits 272 and 274 is provided by difference and threshold circuit 280 whereby when the difference exceeds a predetermined amount, a disabling output is provided to and-gate 282 which otherwise operates less one count circuit 284 in response to the repetitive output from word sync/N counter 276.

Further considering the purpose of the FIG. 11 circuit, it will be appreciated that for certain types of signals such as audio, the sign bit of each word changes slowly on the average. Most of the energy is in the middle and low frequencies so that there are large groups of words that have the same sign. On the other hand, the value of the least significant bit (LSB) is essentially random.

According to the FIG. 11 embodiment, pulse rate circuits 272 and 274 are energized to count upon each transition of the respective bit positions of register 146 to which they are coupled. The average analog output of the pulse rate circuit 272 coupled to the sign bit must be low, while the output of the pulse rate circuit 274 coupled to the least significant bit position must be high. If the word is not being synced at the correct location on register 146, pulses will be accumulated at the wrong rate. As an example, a left shift error will place the sign or the most significant bit of the following word at the LSB position in the register. The pulse rate output from pulse rate circuit 274 will drop at least by a factor of ten. A right shift error will place the high activity least significant bit of the previous word in the sign bit register location, increasing the rate indicating output of circuit 272 by the same order of magnitude.

The difference is taken in circuit 280 and if the rate of the least significant bit minus the rate of the sign bit exceeds a given threshold, gate 282 will be inhibited. However, if the threshold is not exceeded, a wrong location will be indicated and gate 282 will pass the output of word sync/N counter 276 to less one count circuit 284, having the effect of shifting the word in register 146. The word is in effect shifted one bit position to correct the error. The process repeats until the error is zero.

Alternatively, the transition rate of the least significant bit alone may be monitored. The circuitry is essentially the same except the pulse rate circuit 272 and and-gate 268 are dispensed with, while circuit 280 is employed to provide an output when the rate as indicated by circuit 274 exceeds a predetermined value. It will be noted that the least significant bit should have the highest average rate of any bit, and is predictable. The error correction is accomplished as described for the circuit of FIG. 11. An uncertainty may arise when no information at all is being recorded. In order to overcome this uncertainty, even "silence indicating" words may be provided with LSB's always having a transition, or the difference between the LSB and two adjacent bits may be taken in a circuit of the FIG. 11 type. When a difference is taken between the least significant bit and two adjacent bits, a positive or zero difference would then not cause a shifting of data, but a negative difference indicating increased activity for the wrong bit would cause a shifting of data. Activity must be higher for the least significant bit.

The systems described with respect to FIG. 11 have an advantage in that no particular additional synchronizing information need be added to the signal information, the synchronizing being established from characteristics of the recorded signal information.

Figures 12, 13:
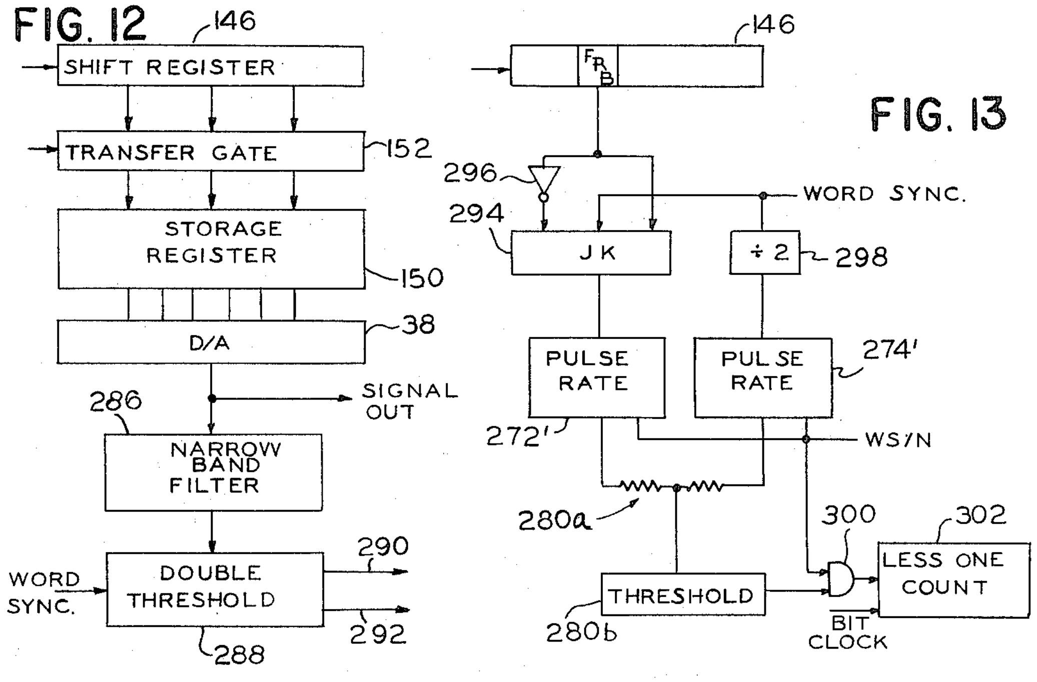
FIG. 12 is a further block diagram of a synchronization system for recognizing a signal added to the recorded information and employed in synchronizing readout.
FIG. 13 is a block diagram of another synchronization system wherein a particular bit is recognized for word synchronization.

A further embodiment of method and apparatus according to the present invention employs the addition of information to the signal. A non-audible signal, outside the allowed recording frequency range (in the case of audiorecording and the like) may be added to the signal during the initial recording period. This signal is extracted by a filter from the reconstructed signal read out. The amplitude of the added signal is known and fixed in value when recorded, and on playback, it will be multiplied or divided by $2^n$, depending on the sign of the sync error, wherein $n$ is the magnitude of the error in bits. Referring to FIG. 12, the readout circuit 36 as illustrated in FIG. 2 is repeated. Also, the analog output is supplied via narrow band filter 286 to double threshold circuit 288. If the added signal, which was recorded at a given frequency, is in the wrong location in shift register 146, the added signal as detected by narrow band filter 286 will be either too small or too large in amplitude as indicated above. The double threshold circuit 288 is arranged to detect a multiplication or division by $2^n$. The respective outputs of the double threshold circuits 290 and 292 are suitably applied respectively to a less one count circuit and an add one count circuit for respectively decreasing or increasing the count in the system's word sync counter and thereby shifting the information until the added signal has the predetermined magnitude indicative of synchronization. The output of narrow band filter 286 is tested by threshold circuit 288 at the word sync time.

Referring to FIG. 13 illustrating a further method and apparatus according to the present invention, a given bit position of register 146 is connected to respective J and K inputs of J-K flip-flop 294, in one case via inverter 296. The J-K flip-flop is clocked by the word sync. An output of J-K flip-flp 294 is applied to a first pulse rate circuit 272′ similar to a corresponding circuit in FIG. 11. The word sync is also applied via a divide-by-two circuit 298 to a second pulse rate circuit 274′ substantially similar to pulse rate circuit 274 in FIG. 11. The outputs of the pulse rate circuits 272′ and 274′ are subtracted by difference means 280a comprising a center tapped voltage divider, the center tap of which is connected to a threshold circuit 280*b*, wherein elements 280*a* and 280*b* have similar functions to the difference and threshold circuit 280 in FIG. 11.

The bit position of register 146 in FIG. 13 coupled to J-K flip-flop 294 corresponds to a "fixed rate bit" which is recorded so that there is a transition with each word. That is, if a given word in the FRB position is a binary one, the FRB in the next word is binary zero, etc. A digital logic comparison is made for this position for each word. It will be seen in FIG. 13 that if the FRB bit changes for each word, J-K flip-flop 294 will in effect provide a divide-by-two output with respect to the word sync. Consequently, the output of J-K flip-flop 294 and the output of divide-by-two circuit 298 should have the same rate and supply the same analog outputs at either end of voltage divider 280*a*. Threshold circuit 280*b* detects a departure from this equal rate and enables and-gate 300, which also receives an input equaling word sync/N. The latter may be derived in the manner indicated with respect to FIG. 11. An output from and-gate 300 actuates less one count circuit 302 which functions to delete one count applied to a word sync counter, in a manner also illustrated in FIG. 11. The system of FIG. 13 then will shift the data in register 146 until proper synchronization is achieved. This system differs from the detection of the rate of the least significant bit alone, also described in connection with FIG. 11, in that the least significant bit system is sensitive to the average rate of a random signal, whereas the system of FIG. 13 is based on a logical certainty. An advantage is a faster and more certain decision as to the word synchronization with the FIG. 13 circuit.

Figure 14:
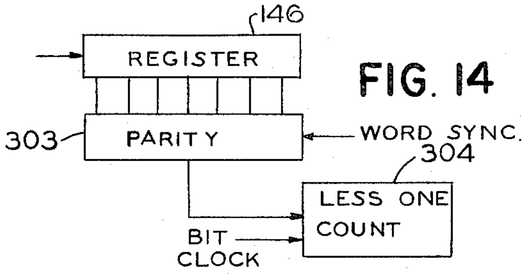
FIG. 14 is a block diagram of a parity synchronization system according to the present invention.

The FIG. 14 circuit pertains to a parity synchronizing method. A true parity bit is in such case added to each word in the recorded data in the same manner as a parity bit is added to computer data. On playback, the reassembled word parity is tested, i.e., indicating the conventional odd or even result or the like, by means of parity detector 303. A repeating error would signify an incorrect sync, and the synchronization in the system is changed by a less one count circuit 304 in a manner hereinbefore described. Generally speaking, the parity detector 303 provides an output for operating less one count circuit 304 only in the case of a repeating parity error, in order to avoid sync shifts in the case of an infrequent reading error.

Figure 15:
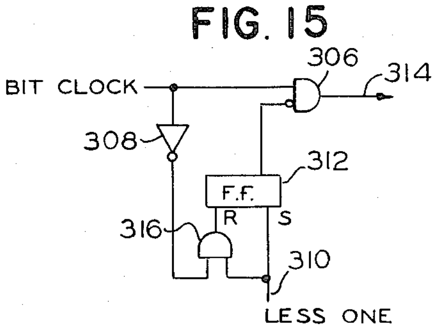
FIG. 15 is a block diagram of a "less one" circuit employed according to the present invention.

A "less one count" circuit suitable for application in the circuits hereinbefore described is illustrated in FIG. 15. As hereinbefore indicated, the circuit receives a bit clock (as from pulse shaper 240 in FIG. 16), and the same is applied to and-gate 306 as well as to inverter 308. A "less one" input command received on lead 130 operates to set flip-flop 312 on the leading edge of the less one input command. Flip-flop 312 provides an output which inhibits and-gate 306 for the next bit clock time, thereby deleting one of the bit clocks otherwise applied to the system word sync counter via lead 314. The flip-flop is reset by means of and-gate 316 by the combination of the trailing edge of said next bit clock (the bit clock being inverted with inverter 308) and the less one command. Thus, the stream of bit clocks provided to the word sync counter is reduced by one. Since the word sync counter counts the number of bits in the word format before emitting an output, the word sync counter will be delayed in its output by one bit clock position and will continue to deliver its word sync output at such relatively shifted time or until another "less one" input command is received. A similar circuit can be used to add counts to the word sync counter, i.e., as in accordance with an appropriate command from double threshold circuit 288 in FIG. 12. Thus, a flip-flop such as 312 commanded by an add one input would provide an additional pulse for application to the word sync counter at the conclusion of a given clock bit.

Figure 19:
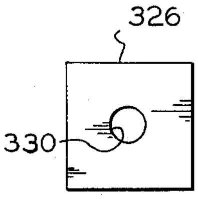
FIG. 19 is an elevational view of a first optical mask employed in the FIG. 18 system.
Figure 20:
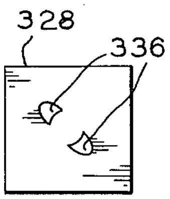
FIG. 20 is an elevational view of the second optical mask employed in the FIG. 18 system.
Figure 18:
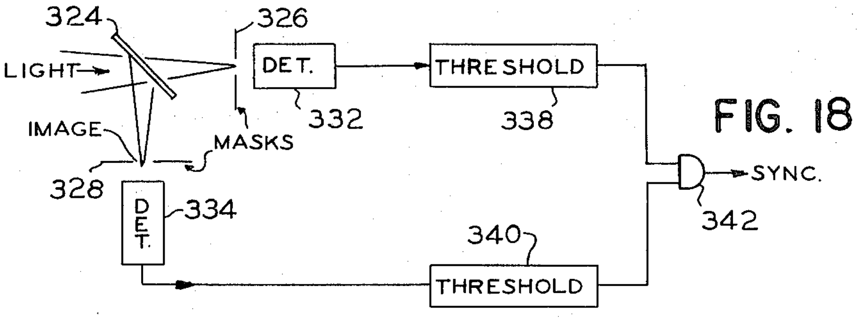
FIG. 18 is a schematic diagram partially in block diagram form of a synchronization system employed in recognizing certain of the FIG. 17 encoded spots.

In accordance with another method of the present invention, a recorded sync spot is employed as in the embodiment illustrated in FIGS. 5*a* and 6*a* but instead of being primarily larger, the sync spots are shaped differently. In FIG. 17, portions of three alternative tracks are illustrated at 318, 320 and 322. In the instance of track 318, a sync spot is indicated as hourglass in shape, while in the instance of track 320 the sync spot is triangular in shape. In track 322 the sync spot is diagonal and boat-shaped, suitably having a central portion substantially the same size as the information bit spots. The different sized sync spots can be differentiated from the data bits spots employing optical means. Referring to FIG. 18, light from a focusing lens, mirror, or the like is directed toward beam-splitting mirror 324, whereby such light is directed not only straight ahead toward a mask 326 but also toward a second mask 328. The spots of a recording (not shown in this figure) are sequentially imaged via the same light path upon mask 326 and mask 328. The masks 326 and 328 are illustrated more fully in FIGS. 19 and 20. The image of a round data spot will pass through aperture 330 in mask 326 for actuating detector 332 in FIG. 18, the latter suitably comprising a photocell. However, a data spot will not provide light for actuating a similar detector 334 through sync spot matching end apertures 336 in mask 328. In the event a sync spot is received (of the type illustrated for track 322 in FIG. 17), light will be detected through the apertures in both masks 326 and 328, operating both detectors. Assuming the light is of a predetermined minimum intensity, threshold circuits 338 and 340 will provide outputs to and-gate 342. The output of and-gate 342 is supplied as word sync, performing the function of sync bit detector 142 in FIG. 2. Transparent spots on an opaque background are assumed for illustration in this embodiment, but opaque spots could also be used.

Figures 21, 22:
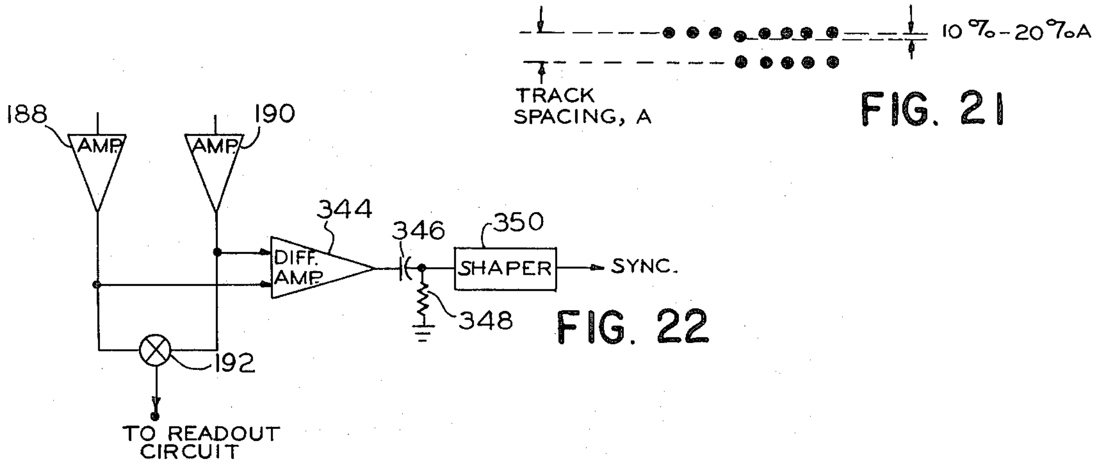
FIG. 21 is a plan view of another photographic record embodiment according to the present invention utilizing encoded spots for synchronization.
FIG. 22 is a schematic diagram of a circuit adapted to provide synchronization employing information recorded in the manner illustrated in FIG. 21.

Track offset may also be employed for synchronization. The sync spot can be identical to data indicating spots but offset from the track by about 10 to 20 percent of the track-to-track spacing as illustrated in FIG. 21. When followed by a tracking system, such as the two-detector type illustrated in FIG. 3, the sudden short "error" indication from a sync spot can be separated from normal slow drift. The circuit is more fully illustrated in FIG. 22, wherein elements 188, 190 and 192 correspond to those also illustrated in FIG. 3. The output of amplifiers 188 and 190 is applied to integrating circuits 196, 200 and 198, 202 in FIG. 3 for tracking purposes. However, the output of amplifiers 188 and 190 is also applied to an additional differential amplifier 344 in FIG. 22, the output of which is differentiated by means of a circuit including capacitor 346 and resistor 348 returned to ground. The differential signal is applied to pulse shaper 350. A slow drift tracking error will produce an insufficient output when differentiated for actuating pulse shaper 350. However, the sudden short "error" indicated for sync purposes in FIG. 21 will produce a spike at the input of pulse shaper 350 which actuates pulse shaper 350 to supply the word sync.

Figure 24:
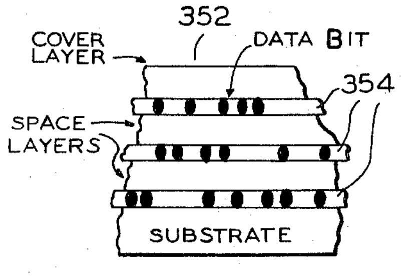
FIG. 24 is a schematic diagram in a system for reading out information from a recording of the FIG. 23 type.
Figure 23:
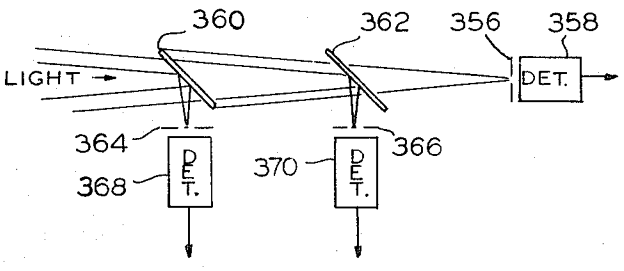

A further method and apparatus in accordance with the present invention is illustrated in FIGS. 23 and 24. The photosensitive record 352 is supplied with a plurality of photosensitve layers 354, separated by non-sensitive materials. Spots can be formed in all sensitive layers through the imaging of light at the plane of a sensitive layer to form spots at the selected layer. The spacing between layers is greater than the depth of focus of the recording optical system employed so each layer can be recorded or read independently. Multiple light sources or detectors can be used for recording and reading, or the focal point can be shifted appropriately if a single light source or detector is to be used. The sync spots are suitably located in a separate photosensitive layer, residing in a separate focal plane, from the data bits. In FIG. 24 apparatus is illustrated utilizing a light beam carrying the information which is directed toward data bit shape apertured mask 356 in front of detector 358, the latter comprising a photocell. An image corresponding to a data bit recorded as a spot in one of the photosensitive layers provides an image at the plane of mask 356 for actuating detector 358. The light also passes through beam-splitting mirrors 360 and 362 which direct light respectively toward masks 364 and 366 in front of detectors 368 and 370. The distance from the photosensitive layer object spots (not shown in FIG. 24) is the same for each of the masks whereby images of the spots of the separate photosensitive layers will be formed in the separate planes of the respective masks. It will be seen that one of the detectors together with the corresponding photosensitive layer may be employed for syncing purposes while the other two detectors and their respective layers may be employed for other information such as stereo audio or the like.

In accordance with another embodiment of the present invention, the spots in different photosensitive layers in FIG. 23 may be recorded in different colors, with corresponding color filters being employed in place of masks 356, 364 and 366. In such case, the different color recorded data need not be separated into spaced layers, but can be differentiated on the basis of color alone. One such color can be employed for synchronization purposes.

While I have shown and described several preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. The method of synchronizing an optical recording of the type comprising a track of a plurality of small spots representing digital bits recorded at high density on a photographic record by light source means, and readable through optically scanning said recording along said track for producing electrical pulses, said method comprising:

serially recording said digital bits in word groups of spots of substantially similar size having a data configuration representative of desired output information and also representative, by the configuration of digital bits, of the identification of word groups along said track, detecting a configuration representative of word group location, scanning the recording to read the digital bits of the record and synchronizing the reading of the same according to word group location so that word groups of said information can be individually read out.

2. The method according to claim 1 wherein said track is organized into raster lines, said method including recording a digital bit at a predetermined location on each line, said last mentioned bit having a predetermined value, said synchronizing during playback including resetting word synchronization upon receipt of a said bit of predetermined value at said location for each raster line.

3. The method according to claim 1 wherein predetermined words of digital bits are recorded with a predetermined code value, and said detection including recognizing such a coded word for resynchronizing readout.

4. The method according to claim 1 wherein each word is provided with at least one bit of predetermined value, said detection including reading said bit position, and said synchronizing including shifting readout information until said bit position continues to indicate said predetermined value.

5. The method according to claim 1 wherein said detection includes detecting unused data configuration, said synchronizing including shifting data read until such data configuration is not detected.

6. The method according to claim 1 wherein said detection includes comparing the pulse rate of a sign bit with a least significant bit of a word and wherein said synchronizing includes shifting data read until the comparison indicates a predetermined ratio between the two.

7. The method according to claim 1 wherein said detection includes detecting the frequency of a given bit, and shifting data until said bit has a predetermined frequency.

8. The method according to claim 7 wherein said given bit is a predetermined bit position.

9. The method according to claim 8 wherein a predetermined bit value is recorded with a fixed recording rate at such predetermined bit position.

10. The method according to claim 1 including adding a given digital signal to the digital bits of the recording, wherein said detection includes separating said additional signal on readout, and said synchronizing including shifting information until a predetermined added signal is detected.

11. The method according to claim 1 including adding a parity bit to each word, detecting parity, and shifting information until the proper synchronization is indicated.

12. The method according to claim 1 wherein certain of said spots have predetermined shapes, said detecting including optically masking light for readout of said spots to detect said spots of predetermined shape.

13. The method according to claim 1 wherein certain of said spots are offset with respect to said track, for indicating synchronization, said detecting including differentially detecting said spots relative to said track to indicate such offset.

14. The method according to claim 1 including recording said spots at separate depths of said record and detecting by optically reading out said information at separate image locations corresponding to said separate depths, one of said depths including synchronizing information.

15. The method according to claim 1 including recording said spots in different colored layers in said record and separately detecting said spots by optically reading out said information by color selective light detectors, one of said colored layers including synchronizing information.

* * * * *

UNITED STATES PATENT OFFICE
CERTIFICATE OF CORRECTION

Patent No. 3,795,902 Dated March 5, 1974

Inventor(s) James T. Russell

It is certified that error appears in the above-identified patent and that said Letters Patent are hereby corrected as shown below:

Column 2, line 23, "photographic" should be --photograph--.

Column 2, line 62, "product" should be --produce--.

Column 4, line 37, "FIg. 6" should be --Fig. 6--.

Column 17, line 2, "flip-flp 294" should be --flip-flop 294--.

Column 19, line 3, "differential" should be --differentiated--.

Signed and sealed this 20th day of August 1974.

(SEAL)
Attest:

McCOY M. GIBSON, JR.
Attesting Officer

C. MARSHALL DANN
Commissioner of Patents